E. BALL.
Mower.
3 Sheets—Sheet 1.
No. 1,008.
Reissued July 17, 1860.
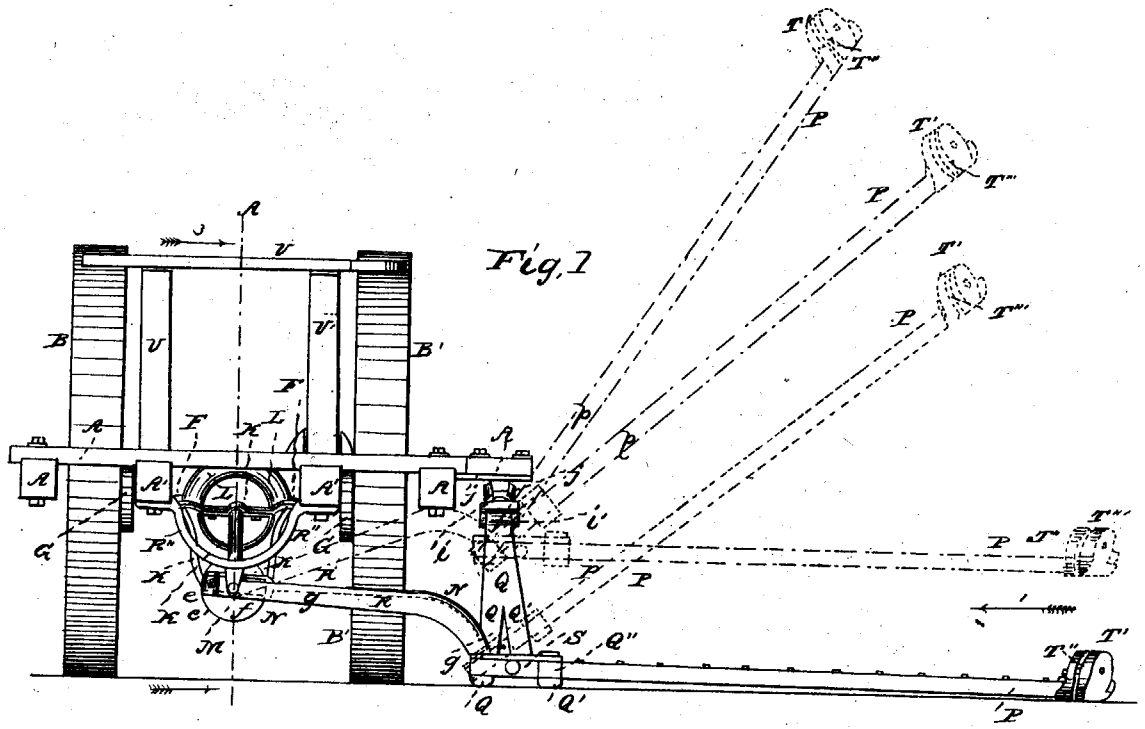
Witnesses:
H. Wooster
W. York Hale
Inventor:
Ephraim Ball
by his attorney
Thos. H. Dodge
N. PETERS, Photo-Lithographer, Washington, D. C.

3 Sheets—Sheet 2.
E. BALL.
Mower.
No. 1,008.
Reissued July 17, 1860.
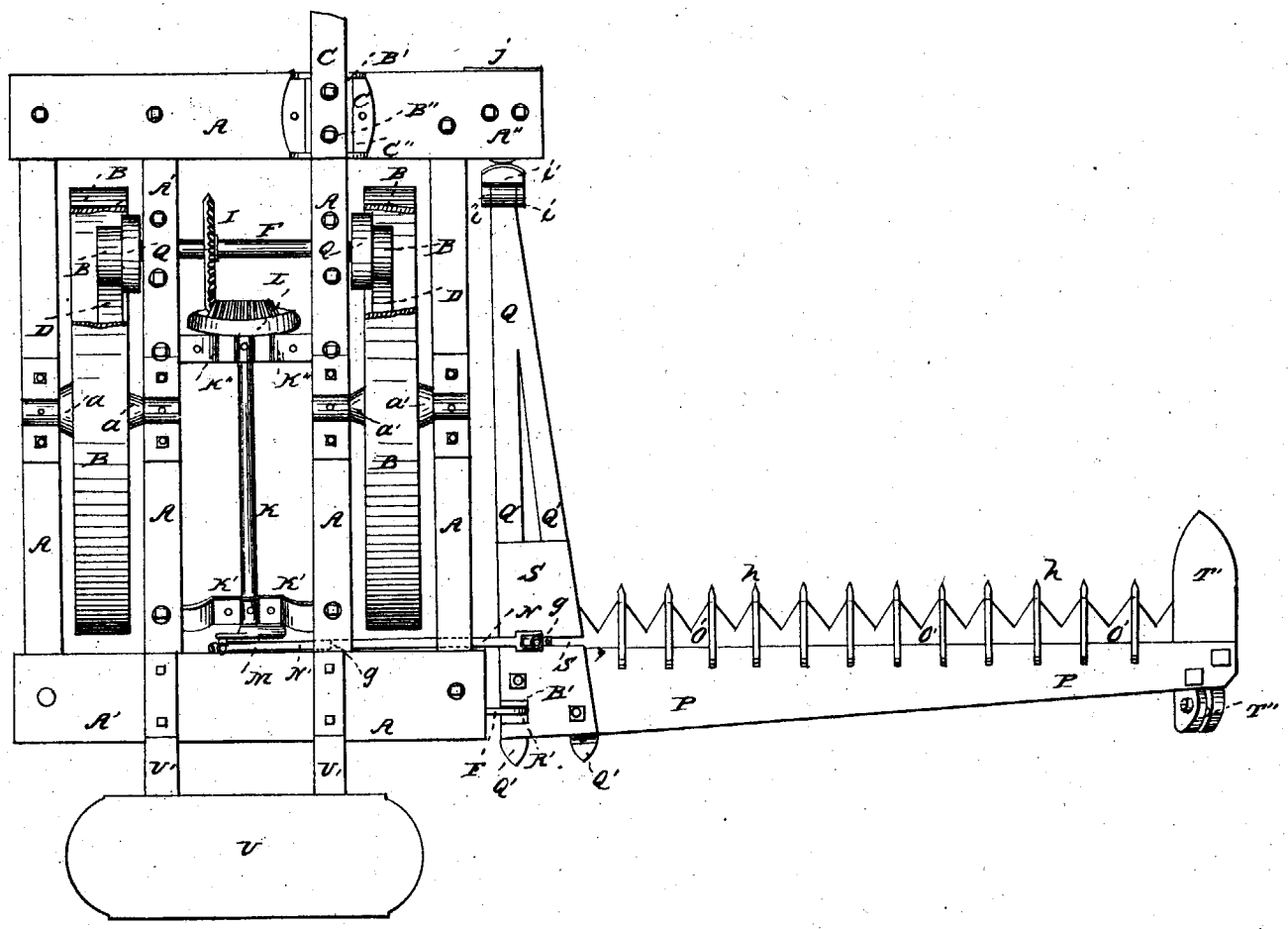
Witnesses:
Alvid Burwell
W. Stokes Hill
Inventor:
Ephraim Ball
By his Attorney
Thos. H. Dodge
N. PETERS, Photo-Lithographer, Washington, D. C.

E. BALL.
3 Sheets—Sheet 3.
Mower.
No. 1,008.
Reissued July 17, 1860.
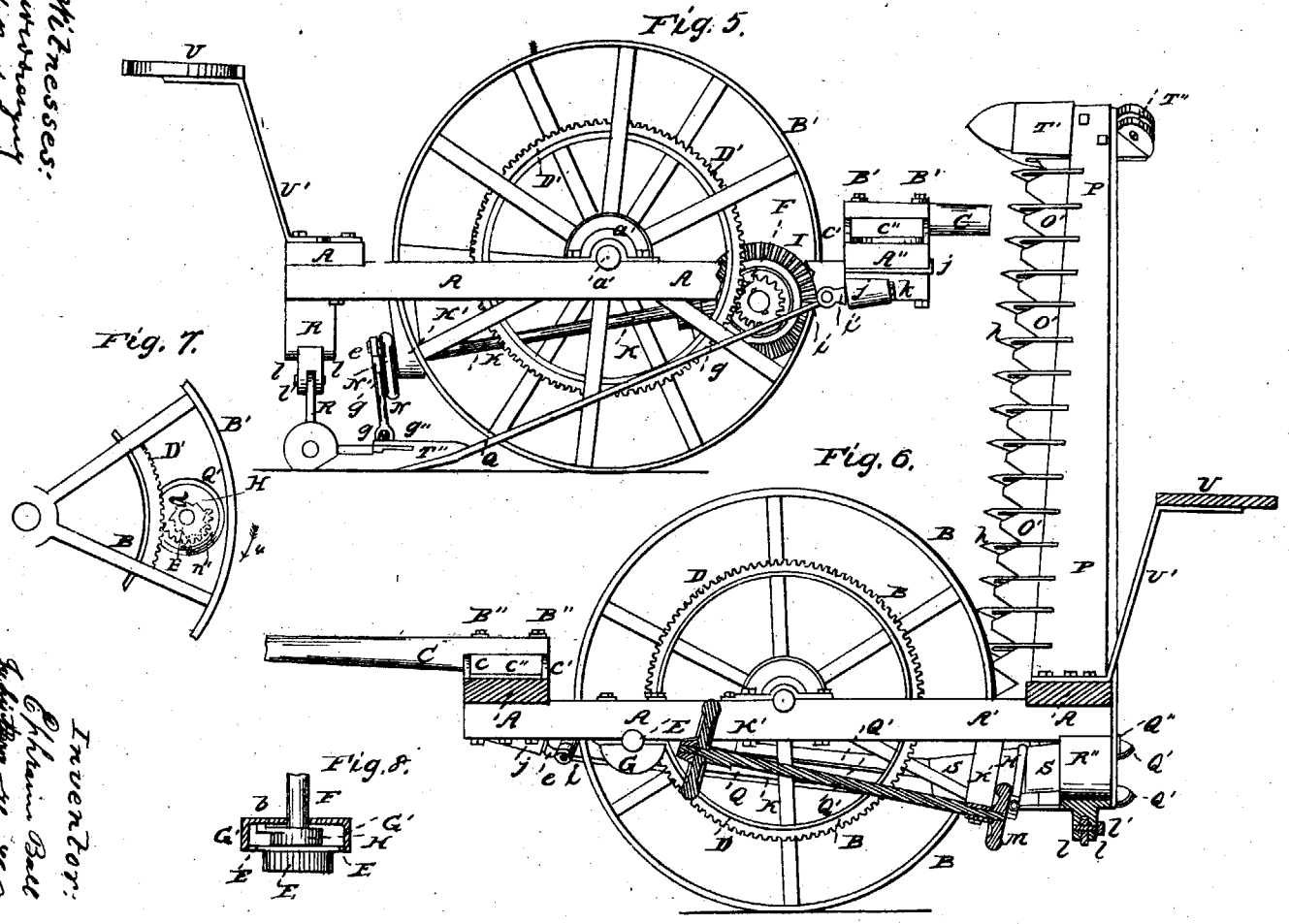
Witnesses:
H. Wurdemann
W. Yorke Stevens
Inventor:
Ephraim Ball
by his Atty Thos. H. Dodge
N. PETERS, Photo-Lithographer, Washington, D. C.

UNITED STATES PATENT OFFICE.

EPHRAIM BALL, OF CANTON, OHIO.

IMPROVEMENT IN MOWING-MACHINES.

Specification forming part of Letters Patent No. 18,788, dated December 1, 1857; Reissue No. 831, dated September 27, 1859; Reissue No. 1,008, dated July 17, 1860.

*To all whom it may concern:*

Be it known that I, EPHRAIM BALL, of Canton, in the county of Stark, in the State of Ohio, have invented certain new and useful Improvements in Mowing-Machines, of which the following is a full, clear, and exact description, reference being had to the accompanying drawings, which make a part of this specification, and in which—

Figure 1 represents a rear view of the machine, the black lines showing the finger-beam resting upon the ground in the position it will occupy when the machine is mowing on a level surface, the blue lines showing one position of the finger-beam when mowing on an uneven surface, with its left end raised to conform thereto, the red lines showing the position of the finger-beam when mowing on an uneven surface, which raises the entire finger-beam, the dotted black lines showing the position of the finger-beam raised up at its right or outer end toward the machine to pass over an obstacle, and the dotted red lines showing the finger-beam in two different positions raised off of the ground and turned up toward the machine to pass over obstacles or through gates. Fig. 5 represents a side view of the machine, looking in the direction of arrow 1, Fig. 1, when the machine is mowing on level ground, a part of the main frame being represented as broken away to show the position of the gearing. Fig. 6 represents a section on line A B, Fig. 1, looking in the direction of arrow 3, the finger-beam being shown in the highest position represented in red dotted lines, Fig. 1. Fig. 7 represents a detached view of a portion of one of the main wheels and a portion of the gearing, a part of the pinion which gears into one of the main gear-wheels being represented as broken away, together with its shield, to show one of the ratchet-wheels with its pawl-spring and case, and by which motion is communicated from the main wheel to the main gear-shaft. Fig. 8 represents a detached plan or top view of one of the pinions on the main gear-shaft, together with its ratchet-wheel and pawl, the top of the case which covers the ratchet-wheel being represented as broken away to show the relative position of the parts. Fig. 10 represents a plan or top view of my machine, a portion of the peripheries of the wheels B B′ being broken away to show the position of the gear-wheels.

Whenever it may be expedient to use one or more of the several branches or parts of my improvements separate from the rest, such part or parts may be used in connection with proper frames and gearing, although different from those herein described, which are proportioned and arranged with reference to the use of the whole of the parts together, and it is obvious that several parts of my improvements are applicable to various other mowing-machines in use.

One mode of applying each of my improvements to practical use being shown in this machine, it is unnecessary to specify the manner of applying the parts respectively to other mowing-machines, since the ordinary skill of the constructor will be sufficient for that purpose.

That branch of my improvements which is the subject of this patent consists, first, in making the coupling-arm of such length that its hinge with the shoe will be outside of the main frame, in combination with arranging the draft-hinge of the shoe also outside of the frame. By this combination and arrangement of parts the finger-beam and cutting apparatus can be raised up bodily until the coupling-arm strikes against the under side of the frame, and then the outer end of the finger-beam can be turned up toward the frame while the coupling-arm remains in contact with the under side of the frame, consequently a greater space will be left below the heel of the finger-beam than there would be if the joint of the coupling-arm next to the finger-beam was under the frame, for the reason that in the latter case after the finger-beam was raised up bodily until the coupling-arm struck the under side of the frame the outer end of the finger-beam could not be raised without canting down the heel end, that point of the finger-beam coming in contact with the under outer corner of the main frame being the center of motion.

It also consists in a particular mode of constructing, arranging, and protecting the gearing.

It also further consists in placing a balance wheel or disk directly back of the gear-wheel J on the upper end of the crank-shaft K, against which the periphery of the bevel-wheel I on the shaft F works, whereby the wheels are prevented from being crowded too close in gear by the springing of the shafts or the frame.

It also further consists in combining a balance wheel or disk with each end of the crank-shaft and on the outside of its bearings, whereby the strain on the center or middle of the shaft is somewhat relieved, while at the same time the balance-wheels, resting against the outside of the bearings, keep the shaft in a straight and proper position.

It also consists in a particular mode of constructing and combining the pitman with the cutting apparatus, whereby the joint motions of the finger-beam and the cutter are rendered free and unrestrained as they rise and fall to conform to the inequalities of the ground.

In the accompanying drawings, A A A′ A′ represent the main frame of the machine, being of rectangular form, and which is supported on the axles *a a′* of the independent driving and supporting wheels B B′ as it is drawn over the ground by the rigid tongue C.

Spur-wheels D D′ are secured to the inner sides of the spokes of the wheels B B′, the spur-wheel D being secured to wheel B and spur-wheel D′ to wheel B′. The spur-wheels D D′ gear into small pinions E E′, which play loosely on the ends of the main gear-wheel shaft F, which runs in suitable bearings attached to the under side of the central beams A′ A′ and near the front of the main frame.

To the shaft F there are attached two shields or cases, G G′, within each of which a pawl, *b*, is secured, and these pawls catch into ratchet-teeth on the wheels H, one of which is attached to the inner side of each of the pinion-wheels E E′, or to a disk, E″, which is placed between the ratchet-wheels H and pinion-wheels E E′, for the purpose of closing up the outer ends of the cases G G′, but which are fastened securely to their respective ratchet and pinion wheels, so that each pinion-wheel, with its disk or shield E″ and ratchet-wheel H, turn together and are loose on the shaft F. (See Figs. 7 and 8.) Small springs *c* are attached to the inside of the cases G G′—one in each case—for the purpose of keeping the pawls *b* in the ratchet-teeth of wheels H when the machine is drawn forward, but which allow the pawls *b* to slip over the teeth on the ratchet-wheels H when the machine is backed, so that the cutters are not operated in backing the machine. Nor does one pawl or ratchet interfere with the free movement of the other. Consequently if one wheel moves faster than the other it operates the cutters, and therefore, turning the machine from the standing grass to avoid or pass obstructions in the path of the finger-beam, does not prevent the cutters from being operated by wheel B′, whereby clogging of the cutters is prevented, which is almost sure to result when the cutters are stopped under such circumstances, inasmuch as the fingers and cutters have to be drawn laterally through the standing grass, unless the team is stopped and the machine backed, which occupies considerable time.

Near the center of the shaft F is fastened the main gear-wheel I, which gears into a bevel-wheel, J, at the upper end of the inclined crank-shaft K, which runs in suitable bearings, K′ K″, attached to the under side of the pieces A′ A′.

Directly back of the pinion J, on the shaft K, there is a fly-wheel or balance, L, which serves to prevent little irregularities in the action of the machine or of its wheels from affecting the action of the sickle, and also as a guide or guard to prevent the wheels I and J from being forced too closely into gear by the springing of shaft F.

To the lower end of shaft K there is attached a combined balance and crank wheel, M, which carries near its periphery a pin, *e*, having a thread cut on its end for the nut *e′*.

The connecting-rod or pitman is composed of two parts, N and N′. The part N′ is forked at one end and has a hole through the other, the forked end carrying a swivel-piece, *f*, having a hole in the middle to fit on the crank-pin *e* in the wheel M, while one end of the part N is turned down, so as to pass through the hole in the end of N′, where it is held by a nut, *f′*, as shown in dotted lines, Fig. 1. By screwing up the nut *f′* the shoulder *g* on the part N is drawn up firm against the end of N′, thus making the rod or pitman nearly as firm as if made of a single piece. The other end of N is forked, and carries between the ends of its forks a swivel-piece, *g″*, having a hole near its middle to fit over and on a projection, *g′*, on the heel of the cutter-bar O, to which the cutters O′ are attached. The swivel-piece *f* is so arranged that its axis of motion is nearly vertical, while that of the swivel-piece *g″* is nearly horizontal. By this arrangement all cramping of the pitman, cutter-bar, and cutters is obviated, while the finger-beam P, which carries the cutters, is rising and falling to conform to the inequalities of the ground.

As the machine is drawn over the ground by the rigid draft-pole or tongue C the driving-wheels B B′ move in the direction indicated by arrow 4, and as the spur-wheels D D′ move in the same direction the pinion-wheels E E′ are caused to move in the direction of arrow 4, (see Fig. 7,) thus giving motion to shaft F by means of the ratchet-wheels H H, pawls *b b*, and cases G G′, and as the shaft F turns motion is communicated to the crank-shaft K, through gear-wheels I and J, whereby a rapid reciprocating motion is imparted to the cutter-bar O and its cutters O′, which work through fingers or guards *h*, attached to the finger-beam P, in consequence of one end of the pitman or connecting-rod being attached to the pin *e* and the other end to the projection *g′* on the heel of the cutter-bar.

The cutters and guard-fingers may be made in any of the well-known forms.

The inner end or heel of the finger-beam P is rigidly secured to the lower double runner or forked ends Q′ Q′ of a strong metallic draft-shoe or brace-bar, Q, the forward end of which extends upward and forward, and is hinged between lugs *i i* of a wrist or swivel, *i′*, which is free to turn on an axis parallel to the line of motion of the machine in a piece, *j*, attached to piece *j′* by a screw-pivot, the piece *j′* being bolted firmly to the under side of the inner projecting part, A″, of the main frame, while the wrist or swivel piece *i′* is held in place by nut K. The outer end of the finger-beam is supported by a shoe, T′, the rear end of which is provided with a slot or opening, T″, in which the track-clearer is to be hinged.

The tongue C is fitted into a metallic tongue-piece, C′, having shoulders C″, and then bolts B″ are passed down through both the tongue-piece and front piece of the main frame.

U is the drivers's seat, supported by springs U′, attached to the rear of the main frame.

By the use of two independent driving-wheels the cutters are kept in motion while turning either to the right or left, and that, too, without the least cramping or twisting of the wheels or their journals, since one wheel can move faster than the other, and in mowing on rough and uneven ground, where there is necessarily much turning to avoid obstructions in the path of the cutter, this is very important. Again, if one wheel happens to drop into a slight hole or strikes against a small stump or stone so as to cause it to slip on or over the ground, the other wheel operates the cutters. As it is important to have the pawl and ratchet device well protected from dirt, cut stalks, and injury, I attach the pawl *b* and their springs *c* to the inside of the cases G G′, which entirely cover the ratchet-wheels H, and also project over disks E″, placed between the pinion-wheels E E′ and the ratchet-wheels H, as shown or indicated in Figs. 7 and 8, where views of detached parts of the machine are given to more fully illustrate the relative position of the parts just described. By this arrangement the cases not only serve to protect the pawl springs and ratchets from dirt and cut stalks, but also afford strong and durable connections with the gear-shaft.

I do not deem a more detailed description of my machine necessary, since parts of my said machine are more fully set forth in other patents granted to me of even date herewith.

What I claim under this patent as my invention is—

1. Extending and hinging the coupling-arm R to the shoe which supports the heel of the finger-beam outside of the frame, in combination with the draft-hinge of the shoe, also outside of the main frame, whereby the finger-beam and cutting apparatus can be first raised up bodily until the coupling-arm strikes against the under side of the frame and then the outer end thereof turned up toward the frame, substantially as set forth.

2. Mounting the two driving-gear wheels and main gear-wheels on separate axles, in combination with a ratchet-wheel and small gear-wheel for each driving-gear wheel, each ratchet-wheel being fitted with a pawl that can be made to stand in gear by the forward motion of the machine and out of gear by the backward motion of the machine, the whole arranged and operating substantially as set forth.

3. The combination of a ratchet-wheel, a pawl, a spring acting on the pawl, and a case with one or both ends of the shaft of the main gear-wheel, whereby the case is made to perform four duties—namely, a support to the pawl, a support to the spring, a cover to protect the pawl spring and ratchet, and the connection by which motion is communicated to the shaft of the main gear-wheel—substantially as set forth.

4. The combination of a shield, E″, with each of the cases G G′, and ratchet wheels, H, substantially as set forth.

5. The combination of the balance-wheel L with shaft K and gear-wheels I J, whereby the balance-wheel is made to perform not only the function of a balance-wheel to regulate the motion of the crank-shaft, but also that of a guide or guard, and shield to keep the gear-wheels I J in their proper and relative positions, substantially as set forth.

6. The combination of a balance-wheel with each end of the crank-shaft and its hangers or bearings, substantially as set forth.

7. Making the pitman in two parts, N N′, in combination with uniting said parts, substantially as set forth.

8. The combination of a hinged cutting apparatus with a pitman or connecting-rod swiveled at both ends, substantially as set forth.

In witness whereof I hereunto signed my name.

EPHRAIM BALL.

Witnesses:
DANIEL GOTSHALL,
D. H. HARMEN.